United States Patent [19]

Bressan et al.

[11] Patent Number: 4,963,290

[45] Date of Patent: Oct. 16, 1990

[54] CORROSION INHIBITORS OF STEELS AND AQUEOUS COMPOSITIONS OF ALKALI MEAL HALIDE CONTAINING THEM

[75] Inventors: Joëlle Bressan, Rosny Sous Bois; Jacques Mezon, Saint Gratien, both of France

[73] Assignee: Gaz de France (Service National), Paris, France

[21] Appl. No.: 310,733

[22] Filed: Feb. 13, 1989

[30] Foreign Application Priority Data

Feb. 18, 1988 [FR] France .................................. 88 01935

[51] Int. Cl.$^5$ .............................................. C23F 11/06
[52] U.S. Cl. ...................................... 252/387; 252/71; 252/74; 252/389.62; 252/389.54
[58] Field of Search ................ 252/71, 389.54, 389.62, 252/68, 71, 74, 387

[56] References Cited

U.S. PATENT DOCUMENTS

| | | | |
|---|---|---|---|
| 2,384,553 | 9/1945 | Kiffer | 252/75 |
| 2,755,170 | 7/1956 | Stubblefield et al. | 23/89 |
| 3,030,308 | 4/1983 | Agnew et al. | 252/74 |
| 3,218,259 | 11/1965 | Verdieck et al. | 252/68 |
| 3,891,568 | 6/1975 | Nishio et al. | 252/389 |
| 4,545,925 | 10/1985 | Bosen | 252/387 X |

FOREIGN PATENT DOCUMENTS 53-25288   3/1978   Japan .

OTHER PUBLICATIONS

"Corrosive Preventive Lithium Composition" 58-2241-87A (Abstract).
"Corrosion Inhibition of Carbon-", 1049313C; 6001 Chemical Abstracts.
"Composition for Absorption Refrigerator", vol. 8, No. 205, Sep. 19, 1984, 59-93778.
"Composition for Absorption Type Freezer-", vol. No. 8 205, Sep. 19, 1984, 84-17304, 3/28.
"Inhibition of Pitting Corrosion-", 60010, vol. 94.
"Absorption Liq. for Absorption-", Mar. 8, 1978-53 (1978) 25288.
"Corrosion Preventing Method-", 52-97460.
*Chemical Abstracts,* Abstract No. 89, vol. 2, 11886g, R. Lipinski, "Low Molydenum-Phosphorus Coding Water Treatments".

*Primary Examiner*—John S. Maples
*Assistant Examiner*—Valerie D. Fee
*Attorney, Agent, or Firm*—Ladas & Parry

[57] ABSTRACT

This invention relates to corrosion inhibitors of steels, particularly carbon steels or low-alloy steels. They are ternary mixtures with synergetic action containing at least one strong base, at least one molybdate and at least one phosphate. This invention also relates to aqueous compositions of alkali metal halide containing said inhibitors. Such compositions are advantageously used as working fluid in high temperature absorption heat pump systems.

18 Claims, No Drawings

CORROSION INHIBITORS OF STEELS AND AQUEOUS COMPOSITIONS OF ALKALI MEAL HALIDE CONTAINING THEM

FIELD OF THE INVENTION

The present invention relates to corrosion inhibitors of steels and aqueous compositions of alkali metal halide containing them.

It relates more particularly to corrosion inhibitors of steels in contact, in an anaerobic medium, with aqueous compositions of alkali metal halides and to their use in said compositions.

Such aqueous compositions of alkali metal halide are of the type used as working fluid in high temperature absorption heat pump systems. The incorporation within them of the corrosion inhibitors according to the invention confers on them effects which are inhibitory to the corrosion of the internal metallic surfaces of said systems.

According to the invention, a solution is thus proposed for the problem of the corrosion of steels in contact, at high temperature, with concentrated aqueous solutions of alkali metal halide.

The corrosion inhibitors according to the invention can be used effectively with carbon steels or low alloy steels, as well as with higher alloy steels (stainless steels, Ni steels, ...).

BACKGROUND OF THE INVENTION

Absorption heat pumps, conventionally reserved for applications at low temperatures, such as refrigeration and air-conditioning, offer at the present time new opportunities with regard to the revalorization of energy in industry. They allow heat to be transferred from a low temperature (50–80° C.) to a high temperature (100 to 150° C.).

Water-alkali metal halide mixtures and, more particularly, water-lithium bromide mixtures, currently used in conventional absorption refrigeration systems, are quite compatible with such high transfer temperatures, provided that they are used at high concentrations by weight of salt (of the order of 60 to 70%) and at working temperatures which may attain 220° C. Under these conditions of use, said mixtures are very aggressive towards the metallic materials of the system and the prevention of corrosion, becoming a major technological objective, requires new solutions which the teachings of the prior art cannot bring.

In fact, in conventional absorption machines, the water-lithium bromide mixtures do not function at temperatures higher than 160° C. and their salt concentration does not exceed 60%. The risks of corrosion of the metallic materials, in contact with such mixtures, are limited by the use of corrosion inhibitors, such as lithium chromate; the molybdates, nitrates or nitrites of alkali metals, and in particular of lithium; benzotriazole and derivatives thereof; antimony trioxide; and certain mixtures thereof... Such aqueous mixtures and the corrosion inhibitors that they contain, as well as systems employing them as working fluid, are known and described in particular in U.S. Pat. Nos. 2 755 170 and 3 218 259 and in Japanese Pat. Nos. 5-97460, 53-25288 and 58-224187.

At high temperatures, said corrosion inhibitors according to the prior art sometimes present disadvantages which preclude or limit use thereof. For example, the polyalcohols are no longer stable; the chromates, nitrates, nitrites and molybdates are rapidly consumed and lead to a worsening of localized corrosion. The other inhibitors, which might be used under harsher conditions — temperature close to 220° C. and a salt concentration of the order of 70% — have proved to be less effective.

SUMMARY OF THE INVENTION

According to the invention, novel corrosion inhibitors are therefore proposed, which are effective, in a deaerated atmosphere, in inhibiting the corrosion of steels, particularly the corrosion of carbon steels or low—alloy steels — steels which constitute the best compromise from the technical and economical standpoint for use in high temperature absorption heat pumps — in contact with aqueous compositions of alkali metal halides containing up to 70% by weight of said alkali metal halide. Said inhibitors according to the invention are effective under such harsh conditions and in particular up to temperatures of the order of 220° C.

They are ternary mixtures with a synergetic action, of which the three constituents are at least one strong base, at least one molybdate and at least one phosphate.

The invention has demonstrated an effect of synergy inherent in this specific mixture of the three constituents and, more particularly, in the association of phosphate(s)-molybdate(s).

DETAILED DESCRIPTION OF THE INVENTION

A mixture may contain one or more strong base(s), one or more phosphate(s) in association with one or more molybdate(s). Generally, it contains one strong base, one molybdate and one phosphate.

The strong base or the mixture of strong bases makes it possible to minimize the aggressiveness of the water-alkali metal halide mixtures, by conferring thereon a slightly basic character. Said strong bases are advantageously selected from sodium hydroxide, potassium hydroxide or lithium hydroxide. Lithium hydroxide is used preferentially. Whatever the inhibitor in question, the presence of a strong base always has a favorable effect. However, in the absence of other inhibitors, the rate of inhibition attained with said strong bases is insufficient. The phosphate(s) and molybdate(s) are selected from the phosphates and molybdates compatible, not reactive, with the aqueous alkali metal halide compositions, in which they are intended, according to the invention, to intervene. They are generally selected from among the phosphates and molybdates of alkali metals, alkaline-earths, silicon and, more particularly, from among the phosphates and molybdates of lithium, sodium, calcium and magnesium.

A ternary mixture, corrosion inhibitor according to the invention, is advantageously a mixture of lithium hydroxide, of lithium and/or sodium molybdate, of lithium and/or sodium phosphate.

The ternary mixtures according to the invention, characterized by the nature of their constituents, allow the preparation of aqueous solutions of alkali metal halides, containing up to 70% by weight of said alkali metal halide and presenting, up to 220° C., satisfactory corrosion inhibiting properties. This is all the more surprising as, as specified hereinabove, the drawbacks of using molybdates at high temperature were known.

Another object of the present invention consists in said aqueous compositions containing an effective quantity of said ternary mixtures It is in their use, beyond a certain concentration, within these compositions, that the value of the ternary mixtures according to the invention has been demonstrated in a surprising manner. Said aqueous compositions may be concentrated and contain up to 70% by weight of said alkali metal halide. They generally contain from 40 to 70% by weight thereof.

Lithium is generally used as alkali metal. The aqueous compositions according to the invention are advantageously aqueous compositions of lithium bromide.

Such compositions are currently used, as specified hereinabove, in absorption heat pump systems.

According to the invention, they contain, as corrosion-inhibiting agent, an effective quantity of a ternary mixture characterized hereinabove.

They contain from 0.01 to 0.2 mole/l of strong base.

Under harsh conditions of use — temperature close to 220° C. and high salt content close to 70% — they advantageously contain from 0.1 to 0.2 mole/l of strong base.

This strong base or the mixture of strong bases must be used in a sufficient quantity to obtain the desired result, as to the alkalinity of the composition, but in a limited amount. Too basic compositions are also aggressive. As specified hereinabove, in the absence of other corrosion inhibitor, the degree of inhibition attained with the strong bases is insufficient.

According to the invention, there are associated with said strong base(s) at least one molybdate and at least one phosphate. The advantage of using these products conjointly has been demonstrated.

They are used in a sufficient quantity to be effective for as long as possible, generally at a concentration of between 0.001 mole/l and 0.2 mole/l.

The upper limit of this range of concentration is not critical. However, the quantities of salts used must be soluble in the compositions according to the invention.

The aqueous compositions of alkali metal halide according to the invention therefore contain from 0.01 to 0.2 mole/l of strong base, from 0.001 to 0.2 mole/l of molybdate(s) and from 0.001 to 0.2 mole/l of phosphate(s).

As indicated hereinabove, the compositions according to the invention may contain one or more strong bases, one or more molybdates in association with one or more phosphates. The nature of the cations associated with the $PO_4^\equiv$ and $MoO_4^\equiv$ anions has also been specified hereinabove.

By way of illustration, it will be indicated that compositions according to the invention — for example an aqueous solution with 70% by weight of lithium bromide — contain as a particularly high-performance corrosion-inhibiting agent:

0.2 mole/l of lithium hydroxide;
lithium and/or sodium molybdate;
lithium and/or sodium phosphate;
the contents by weight of said molybdate(s) and phosphate(s) each being included between 0.2 and 10%.

The ternary mixtures of inhibitors according to the invention are particularly effective, as will be seen from the Table presented hereinbelow.

They enable concentrated aqueous compositions of alkali metal halide to be used under harsh conditions of temperature. Their effectiveness has been tested in high temperature absorption heat pump systems, and in particular in the most sensitive zones thereof: at the level of the welds, the curved zones, ...

The advantages of the mixtures and compositions according to the invention will be more readily understood on reading the results of tests set forth hereinafter.

The effectiveness and the thermal stability of a ternary mixture of corrosion-inhibiting agents according to the invention have been verified.

Long term corrosion tests were conducted in steel autoclaves, containing a glass cell of 1 litre usable volume, maintained at a pressure of 10 bars of argon. For each test, three metallic samples (measuring 37 mm × 15 mm × 3 mm) were used. These samples were suspended from a glass rod in semi-immersion, in total immersion in inhibited solutions according to the invention containing 70%, by weight of LiBr and maintained at 220° C., or above said solutions. Struts likewise made of glass ensure separation of said samples.

Positive results as to the effectiveness of the ternary mixtures according to the invention were obtained in the three cases: total immersion — semi-immersion — vapour phase.

Positive results were also obtained when conducting corrosion tests under strain.

Table I hereinbelow presents the results obtained in the course of general corrosion tests.

TABLE I

Results of the general corrosion tests of a low-alloy steel in a mixture $H_2O$ H3 LiBr(70% by weight) at T = 220° C. and p = 10 atm.

| Inhibitors (% by weight) | | LiOH (% by weight) | Duration of test (hr.) | Loss of weight after the test(mg/dm$^2$) | Speed of corrosion (mg/dm$^2 \cdot$ j) |
|---|---|---|---|---|---|
| Without inhibitor | | 0 | 4 500 | 180 000 | 960* |
| Basic Solution | | 0.2 | 4 500 | 22 500 | 120* |
| Benzotriazole 0.4 | | 0.2 | 4 500 | 970 | 5 |
| Li$_2$MoO$_4$ | 0.2 | 0.2 | 4 500 | 600 | 3.2 |
| Li$_2$MoO$_4$ | 10 | 0.2 | 4 500 | 150 | 0.8 |
| Li$_3$PO$_4$ | 0.2 | 0.2 | 4 500 | 560 | 3 |
| { Li$_2$MoO$_4$ Li$_3$PO$_4$ | 0.2 0.2 | 0.2 | 5 000 | 140 | 0.7 |
| { Li$_2$MoO$_4$ Li$_3$PO$_4$ | 10 10 | 0.01 | 5 000 | 138 | 0.67 |
| { Na$_2$MoO$_4$ | 0.2 | 0.2 | 5 000 | 90 | 0.4 |

TABLE I-continued

Results of the general corrosion tests of a low-alloy steel in a mixture H₂OH3 LiBr(70% by weight) at T = 220° C. and p = 10 atm.

| Inhibitors (% by weight) | | LiOH (% by weight) | Duration of test (hr.) | Loss of weight after the test(mg/dm²) | Speed of corrosion (mg/dm² · j) |
|---|---|---|---|---|---|
| Li₃PO₄ | 0.2 | | | | |
| { Na₂MoO₄ | 0.2 | 0.2 | 5 000 | 88 | 0.4 |
| Na₃PO₄ | 0.2 | | | | |
| { Li₂MoO₄ | 0.2 | 0.2 | 5 000 | 92 | 0.4 |
| Na₃PO₄ | 0.2 | | | | |
| { K₂MoO₄ | 0.2 | 0.2 | 5 000 | 149 | 0.8 |
| K₃PO₄ | 0.2 | | | | |
| { CaMoO₄ | 0.2 | 0.2 | 5 000 | 100 | 0.5 |
| Ca₃(PO₄)₂ | 0.2 | | | | |
| { K₂MoO₄ | 0.2 | 0.2 | 5 000 | 93 | 0.4 |
| Li₃PO₄ | 0.2 | | | | |
| Li₂MoO₄ | 0.2 | 0.2 | 5 000 | 95 | 0.45 |
| Ca₃(PO₄)₂ | 0.2 | | | | |

*Corrosion pits and holes have been observed in the metallic samples in the course of these tests.

A comparison of the various results of these corrosion tests makes it possible to assess the synergetic anti-corrosion power of the ternary mixtures according to the invention with respect to that of an anti-corrosion agent according to the prior art (benzotriazole), and in relation to that of each of its constituents: LiOH, a molybdate, a phosphate.

These results show in particular that 0.4% of a molybdate-phosphate mixture is just as effective as, and even more effective, than 10% of molybdate alone.

What is claimed is:

1. A corrosion-inhibiting agent comprising a ternary mixture of inorganic compounds containing at least one strong base, at least one molybdate and at least one inorganic phosphate, said ternary mixture being adapted for inhibiting the corrosion of steels in contact with aqueous compositions of alkali metal halide at concentrations of said halide above 60% by weight and at temperatures above 160°.

2. An agent as claimed in claim 1, wherein the base is lithium hydroxide.

3. An agent as claimed in claim 1 wherein the phosphate(s) and molybdate(s) are selected from the phosphates and molybdates of alkali metals, alkaline earths, and silicon.

4. An agent as claimed in claim 3, wherein the phosphate(s) and molybdate(s) are selected from the phosphates and molybdates of lithium, sodium, potassium, calcium, and magnesium.

5. An agent as claimed in claim 1, wherein the ternary mixtures contain lithium hydroxide, lithium and/or sodium phosphate.

6. An aqueous composition for use as a working fluid in high temperature absorption heat pump systems comprising an alkali metal halide and a ternary mixture of inorganic compounds in an amount effective to inhibit the corrosion of steels in contact with the composition, said ternary mixture containing at least one strong base, at least one molybdate, and at least one inorganic phosphate.

7. The composition of claim 6, wherein the alkali metal halide is present in an amount of from about 40 to 70% by weight.

8. The composition of claim 6, wherein said alkali metal halide is lithium bromide.

9. The composition of claim 6, containing 0.01 to 0.2 mole/1 of the base, 0.001 to 0.2 mole/1 of the molybdate, and 0.001 to 02 mole/1 of the phosphate.

10. The compositions of claim 9, containing 0.1 to 0.2 mole/1 of the base.

11. The composition of claim 6, wherein the base is lithium hydroxide present in an amount of 0.2 mole/1, the molybdate is lithium and/or sodium molybdate, and the phosphate is lithium and/or sodium phosphate, and wherein the contents by weight of said molybdate and said phosphate are between 0.2 and 10%.

12. The composition of claim 11, wherein the alkali metal halide is present in an amount of above 60% by weight.

13. The composition of claim 6, wherein the alkali metal halide is present in an amount of about 70% by weight.

14. A method for inhibiting the corrosive effects of an aqueous composition of alkali metal halide upon steels when such composition is used as a working fluid in high temperature absorption heat pump systems, said method comprising adding to said composition a ternary mixture of inorganic compounds comprising at least one strong base, at least one molybdate, and at least one inorganic phosphate.

15. A method as claimed in claim 14 further comprising using the resultant product as a working fluid in an absorption heat pump system at temperatures above 160° C.

16. A method as claimed in claim 15, wherein the alkali metal halide in the resultant product is present in an amount of above 60% by weight.

17. A corrosion-inhibiting agent consisting essentially of inorganic compounds, including a ternary mixture containing at least one strong base, at least one molybdate, and at least one inorganic phosphate.

18. An aqueous composition for use as a working fluid in high-temperature absorption heat pump systems consisting essentially of inorganic compounds, including an alkali metal halide and a ternary mixture in an amount effective to inhibit the corrosion of steels in contact with the composition, said ternary mixture containing at least one strong base, at least one molybdate, and at least one phosphate.

* * * * *